United States Patent [19]
vanderMark

[11] 4,039,488
[45] Aug. 2, 1977

[54] FOAMABLE VINYL-CHLORIDE POLYMERS AND HARD FOAM STRUCTURES MADE THEREOF

[75] Inventor: Johannes M.A.A. vanderMark, Bunnik, Netherlands

[73] Assignee: Stamicarbon B.V., Geleen, Netherlands

[21] Appl. No.: 709,533

[22] Filed: July 28, 1976

[30] Foreign Application Priority Data

July 29, 1975 Netherlands .................. 7509004

[51] Int. Cl.$^2$ ........................................... C08J 9/10
[52] U.S. Cl. .................. 260/2.5 HA; 260/2.5 R; 260/2.5 P; 260/2.5 E; 260/28.5 D; 260/876 R; 260/876 B; 260/897 C
[58] Field of Search ............. 260/897 C, 2.5 R, 2.5 P, 260/2.5 E, 2.5 HA

[56] References Cited

U.S. PATENT DOCUMENTS 3,211,677 10/1965 Field et al. .................. 260/2.5 P
3,442,837 5/1969 Brotz et al. .................. 260/897 C

*Primary Examiner*—Morton Foelak
*Attorney, Agent, or Firm*—Cushman, Darby & Cushman

[57] ABSTRACT

Improved foamable polymer compositions of polyvinyl chloride or copolymers containing vinyl chloride, with little or no plasticizer, are described. The foamable polymer compositions contain polyvinyl chloride, or a vinylchloride-copolymer, a chemical blowing agent, and a high molecular weight polyethylene. The compositions may also contain stabilizers, lubricants, additives to improve impact strength, etc. Rigid low density foam products are made from these compositions.

10 Claims, 2 Drawing Figures

FOAMABLE VINYL-CHLORIDE POLYMERS AND HARD FOAM STRUCTURES MADE THEREOF

BACKGROUND OF THE INVENTION

Foamable polyvinyl chloride compositions containing little or no plasticizer are known. See, for example, published British patent Specification No. 1,321,706, which is hereby incorporated by reference. These compositions, with at most only minor amounts of a plasticizer component, are particularly suitable for the manufacture of extruded rigid foam articles such as tubes and other shaped members. As those in the art are aware, these foamable polymer compositions contain polyvinylchloride, or a vinylchloride copolymer, a chemical or physical blowing agent, and one or more additives, such as stabilizers, auxiliary stabilizers, substances to improve impact strength, lubricants, etc.

These foamable polyvinyl chloride compositions are extruded into shaped articles such as tubes, etc. The rigid foam tubes, and other rigid foam shaped articles, have many uses.

An important physical characteristic of these rigid foam articles is their density. It is often desirable to obtain rigid foam articles with as low a density as possible. One way of producing a low density polyvinyl chloride foam is to add large amounts of a chemical or physical blowing agent to the foamable polyvinyl chloride composition. However, such compositions are difficult to use in the production of foamed extruded articles such as tubes and shaped members. The amount of foaming agent may be so large that the foaming proceeds too vigorously, so that an irregular foam with uneven cells and an uneven surface is formed. In addition, the density of the foamed product is difficult to control and may be higher than is desired. Finally, low density extruded hard foamed articles made by this method exhibit poor dimensional stability at elevated temperatures so that such extruded articles are not suitable for applications requiring constant dimensions.

Another method of producing a polyvinyl chloride foam is by adding certain modifiers, e.g., copolymers of butadiene, styrene, and/or α-methylstyrene, and also acrylonitrile, polyacrylates, or polymethacrylates, to promote the foaming into a foam having regular cells and an even surface. However, relatively large quantities of modifier must be added, and this, is expensive, particularly as the above modifiers as such are expensive and of considerably higher price than the vinylchloride polymers.

SUMMARY OF THE INVENTION

The present invention provides foamable polyvinyl chloride compositions from which improved low density, hard, extruded foamed articles may be made.

It is an object of this invention to produce vinyl chloride polymer compositions that can be processed into foams having a regular cell structure.

Another object of this invention is to produce vinyl chloride polymer compositions that can be processed into foams having a comparatively low density.

Another object of this invention is to produce foamable vinyl chloride polymer compositions that can be processed into foamed articles whose dimentional stability at elevated temperatures is such that articles of accurate dimension can be made.

Another object of the invention is to produce foamable vinyl chloride polymer compositions that can be processed into extruded foamed articles, particularly tubes and other shaped members, having a smooth surface appearance.

Surprisingly, it has been found that the incorporation of comparatively minute amounts of a high molecular weight polyethylene in a foamable vinyl chloride polymer composition makes it possible to produce vinyl chloride polymer compositions which satisfy the objects of the present invention.

DETAILED DESCRIPTION OF THE INVENTION

Figure 1:
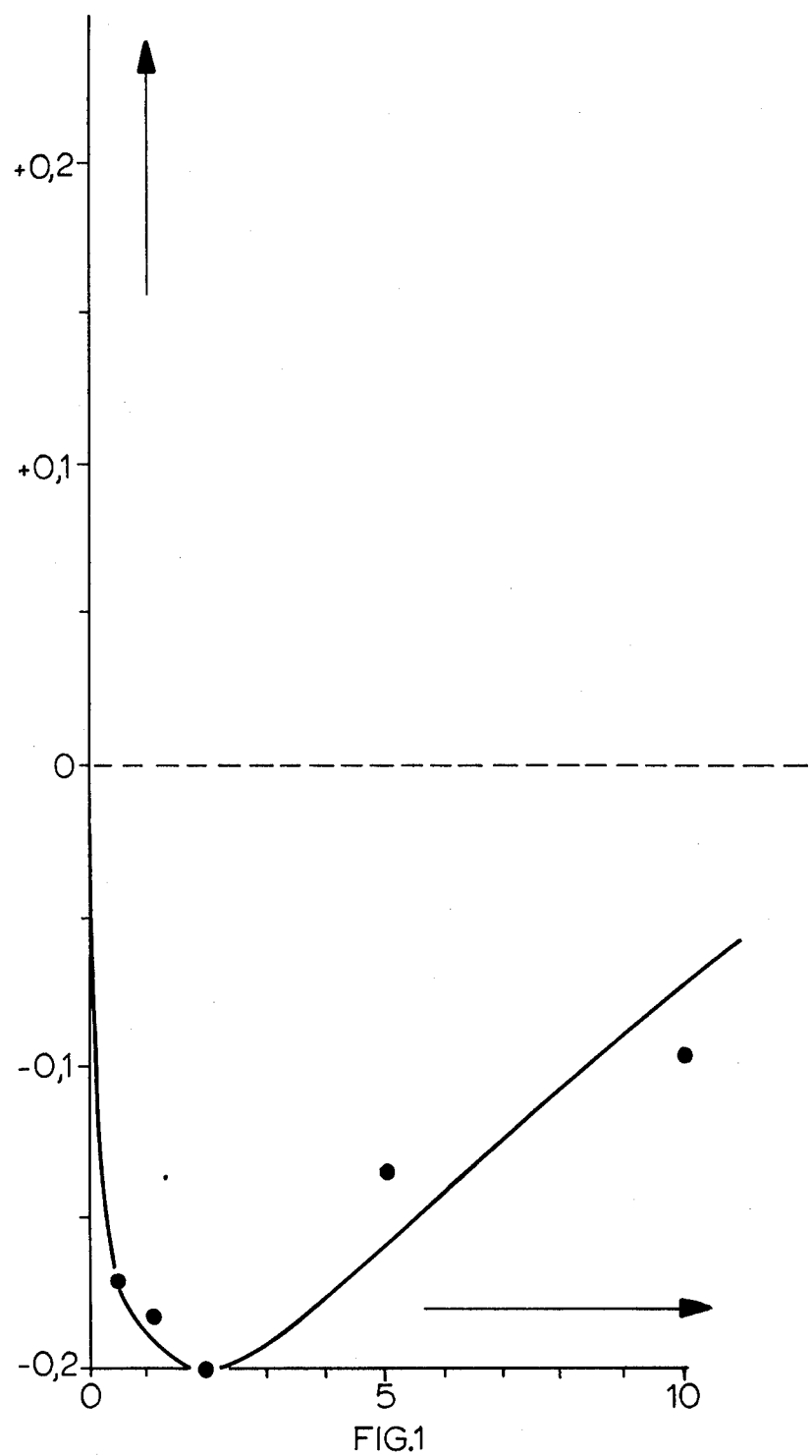
FIG. 1 shows the density of foamed polyvinyl chloride compositions containing from 0.5 to 10 parts of high molecular weight polyethylene having a melt index measured under a load of 0.006 per 100 parts of polyvinyl chloride, compared to the density of foamed polyvinyl chloride alone. In all cases the density of compositions containing high molecular weight polyethylene is found to be lower than the density of polyvinyl chloride alone. The lowest densities were obtained using about 2 parts of high molecular weight polyethylene per 100 parts by weight of polyvinyl chloride.

It has been found in accordance with the present invention that foamable polymer compositions containing poly vinyl chloride, or copolymers of vinyl chloride and another monomer, with little or no plasticizer and having a uniform cell structure, a comparatively low density and producing extruded articles having a smooth surface appearance, and exhibiting a good dimensional stability at elevated temperature, can be obtained by using a composition which contains a high molecular weight polyethylene in addition to the normal additives and usual foaming agent. The high molecular weight polyethylene which is incorporated in the compositions according to the present invention has a melt index (measured according to ASTM-D 1238 condition E) of at most 0.1. In accordance with the present invention, it has been found that the incorporation of a comparatively minute quantity of such a high molecular weight polyethylene in a vinyl chloride polymer composition makes it possible to obtain vinyl chloride polymer compositions that can be processed into foams having a regular cell structure, a comparatively low density, and producing rigid foamed extruded products having good dimentional stability at elevated temperatures and having a smooth surface appearance. The high molecular weight polyethylene is incorporated in amounts from about 0.5 parts by weight to about 10 parts by weight per 100 parts by weight of vinyl chloride polymer.

The foamable vinyl chloride polymer compositions of the present invention contain both additives and a foaming agent. The vinyl chloride polymers in the present compositions may be homopolymers of vinyl chloride or copolymers of vinyl chloride with up to 30% by weight of one or more comonomers.

Compounds that may have been copolymerized with vinyl chloride, are, for example, vinylidene chloride, vinyl esters, such as vinyl acetate, vinyl butyrate and vinyl benzoate, acrylic acid and α-alkyl acrylic acids, alkyl esters, amides or nitriles thereof, e.g., ethacrylic acid, ethyl acrylate, methyl methacrylate, butyl ethacrylate, acryl amide and acrylonitrile, vinylcompounds, e.g., styrene, chlorostyrene, methyl styrene, ethyl styrene, vinyl naphthalene, alkyl esters of maleic acid and fumaric acid e.g., diethyl maleate, vinyl alkyl esters and vinyl alkyl ketones, vinyl pyridines, copolymerizable olefins, such as ethene, propene, isobutene, 4-methyl pentene-1. Mixtures of polyvinyl chloride with copolymers of vinyl chloride may also be used. The term copolymers also comprises graft and block copolymers, such as e.g., graft copolymers of vinyl chloride on ethene/vinyl acetate copolymers. Use may also be made of mixtures of polyvinyl chloride with other polymers, such as ethene-vinyl acetate copolymers or chlorinated polyethane.

When copolymers of vinyl chloride and one or more other monomers are used, in the practice of the present invention, it is preferred that the copolymers contained at least 70% by weight of vinyl chloride and no more than 30% by weight of other monomers. It is particularly preferred, in the practice of the present invention, that copolymers contain at least about 90% by weight of vinyl chloride, and no more than about 10% by weight of other monomers. Comonomers which are particularly preferred in the practice of the present invention include vinylidene chloride, vinyl esters, and acrylic esters.

The vinyl chloride polymers to be used according to the invention may also have been mixed with postchlorinated vinyl chloride polymers. The various constituents of the vinyl chloride polymer or copolymer may be mixed in any physical form in which these constituents may be available. It is preferred, however, that these various constituents be mixed in the form of powders. It is especially preferred that these powdered constituents be granulated prior to mixing. The vinyl chloride polymers used in the present invention contain at most about 5 parts by weight of a plasticizer per 100 parts vinyl chloride and have a Fikentscher K-value as defined in Cellulosechemie 13, 58 (1932) that ranges preferably between about 45 and about 80 and, more in particular, between about 50 and about 70.

The vinyl chloride polymer used may have been prepared by any process which is well known in the art. For example, suspension polymerization, emulsion polymerization, bulk polymerization, and solution polymerization are all suitable.

The density of the vinyl chloride polymer foam is determined in part by the nature and amount of the blowing agent which is incorporated in the composition. The use of the chemical blowing agent in amounts from about 0.1 to about 2 parts by weight per 100 parts by weight of vinyl chloride polymer produces foams having densities from about 0.4 to about 1 g/cm$^3$. The blowing agent is preferably used in amounts from about 0.2 to about 1.5 parts by weight per 100 parts by weight of vinyl chloride polymer. Most preferably, the blowing agent is used in amounts from about 0.2 to 1.0 parts by weight per 100 parts by weight of vinyl chloride polymer. Widely different chemical blowing agents may be incorporated in the composition according to the invention. Suitable blowing agents are agents releasing nitrogen, for example, azobisformamide, azodicarbon amide, azobisisobutyronitrile, diazoaminobenzene, p,p'-oxybis(benzene sulphonyl hydrazyde), N,N' dinitrosopentamethylene tetramine, p,p' azobis (benzene-sulfonylsemicarbon-amide), diethyl azoisobutyrate, 1,3-bis(xenyl)-triazine, and 4,4'-oxybis (benzene sulphonyl hydrazyde). In general, these blowing agents are azo, nitroso, or sulphonyl-hydrazine compounds.

The density of the foamed product produced by a foamable polyvinyl chloride composition is determined in part by the amount of blowing agent. It is generally desirable to obtain the lowest possible density. However, it is also possible to obtain a foam structure which is as uniform as possible. The requirement of uniformity sets limits on the amount of foaming agent which may be used. Although comparatively large amounts of foaming agent make it possible to obtain foams with a low density, the use of such large amounts of foaming agent may result in foaming which proceeds too vigorously. The products of too vigorous foaming exhibit uneven cell structure and an uneven surface appearance. For this reason, it is desirable to limit the amount of foaming agent to no more than about 1 part by weight blowing agent per 100 parts by weight of vinyl chloride polymer. The maximum amount of blowing agent which may be incorporated in the composition is a function of the particular foaming agent used, the volume of gas which a given weight of a particular blowing agent will produce, the rate at which the gas is produced, etc. The optimum maximum amount of any particular blowing agent which may be used can be readily determined by those of ordinary skill in the art.

Activators which lower the temperature at which the blowing agent releases gas may be used. These activators are generally lead, barium, cadmium, or zinc salts, or the like.

Lubricants and mixtures of lubricants and other conventional additives may be incorporated in the compositions according to the present invention. Lubricants and mixtures of lubricants are incorporated in the compositions according to the present invention in amounts of about 0.5 to about 5 parts by weight per 100 parts by weight of vinyl chloride polymer. Preferably, lubricants and mixtures of lubricants are incorporated in amounts from about 1 to about 4 parts by weight per 100 parts by weight of vinyl chloride polymer. Suitable lubricants, or mixtures of lubricants, are for example, paraffin, polyethylene waxes, calcium stearate, ethylene bis-stearyl amide, and other lubricants which are well known to those in the art.

Finely divided inorganic fillers and/or pigments may also be incorporated in the compositions of the present invention in amounts from about 1 to about 15 parts by weight per 100 parts by weight of vinyl chloride polymer. Examples of such fillers and pigments which may be incorporated in the compositions according to the present invention are titanium dioxide, iron oxide, calcium carbonate and silicon dioxide.

Stabilizers and other additives may be used in the compositions according to the present invention. For example, stabilizers composed of lead compounds, barium-cadmium compounds, or tin compounds may be incorporated in the compositions according to the present invention in amounts from about 0.5 to about 4 parts by weight per 100 parts by weight of vinyl chloride polymer. The oxides, hydroxides or fatty-acid salts of these metals are generally most effective. These stabilizers are added to improve the heat and light stability of the vinyl chloride polymer.

If desired, the properties of the foamable vinyl chloride polymers of the present invention can be further improved by incorporating one or more of the conventional modifiers, such as post-chlorinated polyvinyl chloride, ABS, MBS, MABS, or polymethyl methacrylate, all well known to those in the art.

The foamable vinyl chloride compositions of the present invention are used to produce hard foam structures, particularly hard foam extruded structures. Therefore, in accordance with the present invention, no plasticizers or solvents are generally used. It is, however, within the scope of the present invention to use very small amounts of a plasticizer. No more than about 5 parts by weight of plasticizer per 100 parts by weight vinyl chloride are used.

The present invention will be further elucidated by the following two Examples, but the invention is not limited to these Examples. It is understood that various other modifications will be apparent to and can readily be made by those skilled in the art without departing from the scope and spirit of this invention. Accordingly, it is not intended that the scope of the claims appended hereto be limited to the description set forth herein, but rather that the claims be construed as encompassing all the features of the present invention including all features which would be treated as equivalents thereof by those skilled in the art to which this invention pertains.

EXAMPLE 1

A foamable polyvinyl chloride composition was prepared, hereafter called the parent composition, to which was added varying amounts of a high molecular weight polyethylene. Hard foam extruded structures were made from each of the compositions, both those which contained the high molecular weight polyethylene and the parent composition which did not contain the high molecular weight polyethylene. The density of each of these hard foam structures was determined and compared as a function of the amount of high molecular weight polyethylene incorporated. Each composition tested was identical except for the amount of high molecular weight polyethylene incorporated therein.

The polyvinyl chloride parent composition consisted of polyvinyl chloride with a Fikentscher K-value of 59 and, per 100 parts by weight of polyvinyl chloride, the following ingredients:

3.5 parts by weight of a barium-cadmiumlead stabilizer;
1.2 parts by weight of a lubricant composed of a technical-grade mixture of higher fatty acids, metal salts thereof, and esters of higher alcohols with higher fatty acids;
0.5 parts by weight of azodicarbon amide;
5 parts by weight of fine calcium carbonate; and
2 parts by weight of titanium dioxide.

Into this parent composition varying amounts of a high molecular weight polyethylene were incorporated. In particular, five compositions were prepared: the first containing 0.5 parts of high molecular weight polyethylene per 100 parts by weight of polyvinyl chloride; the second containing 1 part by weight of high molecular weight polyethylene per 100 parts by weight of polyvinyl chloride; the third containing 2 parts by weight of high molecular weight polyethylene per 100 parts by weight of polyvinyl chloride; the fourth containing 5 parts by weight of high molecular weight polyethylene per 100 parts by weight of polyvinyl chloride; and the fifth containing 10 parts by weight of high molecular weight polyethylene per 100 parts by weight of polyvinyl chloride. The particular high molecular weight polyethylene used was "Hostalen GUR", a product of Farbwerke Hoechst AG, which has such a high molecular weight that its melt index according to ASTM D-1238 can only be measured under a load of 30 kg. The melt index determined under a load of 30 kg. amounts to only 0.006. The compositions produced by incorporating this high molecular weight polyethylene into the parent polyvinyl chloride composition were polymerized, foamed and extruded into bands. The density of these bands was measured. FIG. 1 illustrates the densities of each of these five bands, compared to the density of a band produced from the parent polyvinyl chloride composition. It will be noticed that in every case the density of the composition produced according to the present invention incorporating high molecular weight polyethylene, is lower than the density of the parent polyvinyl chloride composition. It will be further observed that the lowest density was obtained when about 2 parts by weight of high molecular weight polyethylene were added to 100 parts by weight of polyvinyl chloride. It was also observed that the compositions according to the present invention, incorporating high molecular weight polyethylene, produced a foamed extruded product with uniform cells and a smooth surface appearance.

EXAMPLE 2

Figure 2:
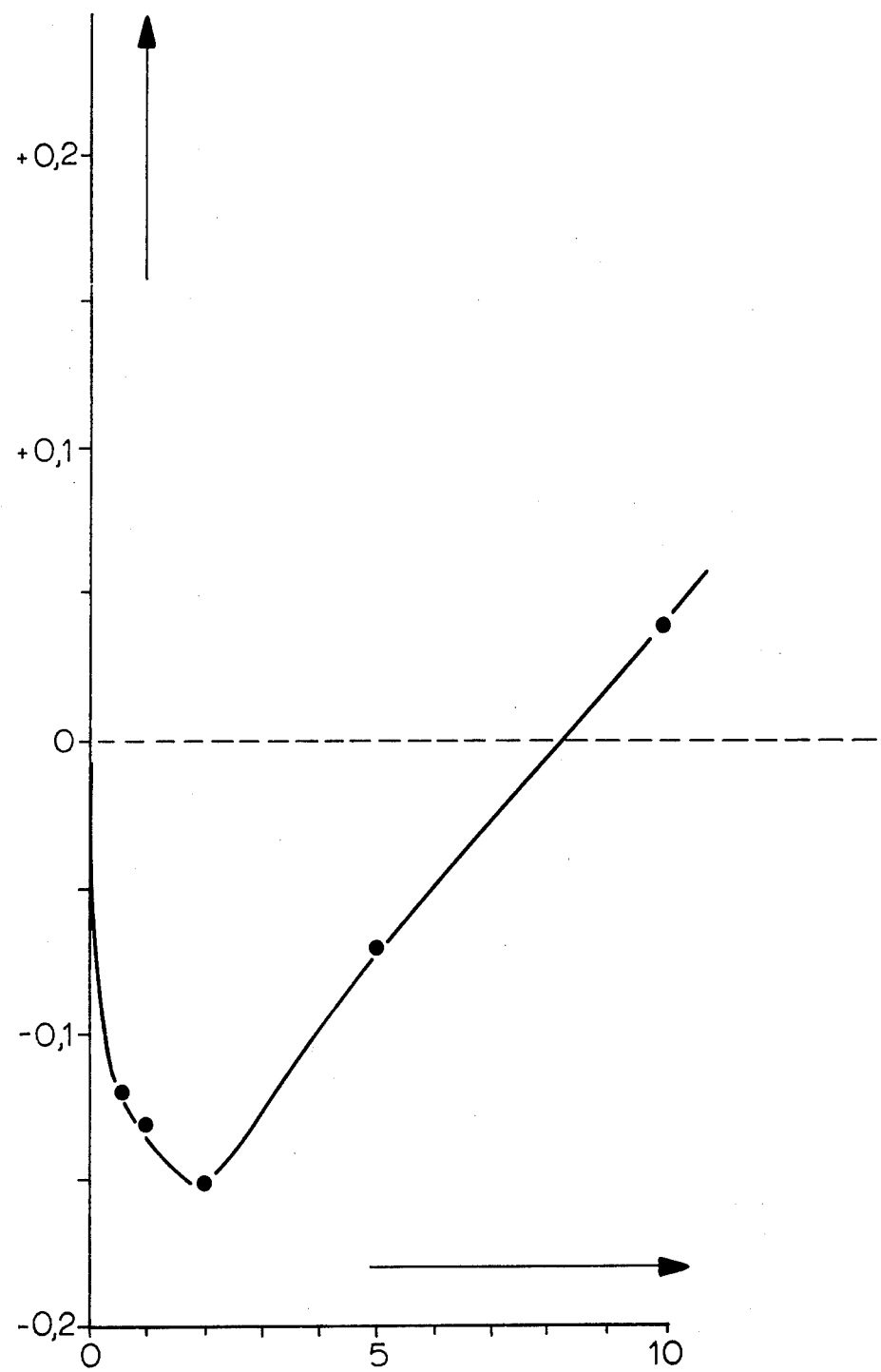
FIG. 2 shows the densities of foamed polyvinyl chloride compositions containing a high molecular weight polyethylene having a melt index of 0.1, and the density of the foamed polyvinyl chloride composition alone. Generally, the density of the foamed polyvinyl chloride composition containing high molecular weight polyethylene was found to be lower than the composition of the foamed polyvinyl chloride alone. The lowest densities were again obtained at a content of about 2 parts of high molecular weight polyethylene per 100 parts of polyvinyl chloride.

The parent polyvinyl chloride composition described in Example 1 was used to prepare another series of five compositions respectively incorporating 0.5, 1, 2, 5 and 10 parts by weight of a high molecular weight polyethylene with a melt index of 0.1. The five compositions incorporating polyethylene thus produced, and the parent composition, were polymerized, foamed and extruded into bands. The density of each band was determined. FIG. 2 compares the density of each composition containing high molecular weight polyethylene with the density of the parent composition. In this case it is observed that the density of each composition incorporating polyethylene containing up to at most about 8 parts by weight of high molecular weight polyethylene per 100 parts by weight vinyl chloride polymer, is lower than the parent composition. Each of the foamed extruded products exhibited uniform cell structure and a smooth surface appearance.

What is claimed is:
1. A foamable vinyl chloride polymer composition, comprising: poly vinyl chloride or a vinyl chloride copolymer containing up to 30% by weight of at least one comonomer and at least 70% by weight of vinyl chloride,
from 0.1 to 2% by weight of a chemical blowing agent,
from 0 to 5% by weight of a plasticizer, and
from 0.5 to 8% by weight of a high molecular weight polyethylene having a melt index of at most 0.1 as defined in ASTM-D 1238, all percentages being calculated on the quantity of vinyl chloride polymer.
2. The foamable vinyl chloride polymer composition of claim 1 wherein the vinyl chloride polymer contains at least 90% by weight of vinyl chloride.

3. The foamable vinyl chloride polymer composition of claim 1 wherein said high molecular weight polyethylene is present in an amount from 0.5 to 5% by weight.

4. The foamable vinyl chloride polymer composition of claim 1 wherein said high molecular weight polyethylene is present in an amount from 1.5 to 2.5% by weight.

5. A process of preparing a hard poly vinyl chloride foam product, comprising:
   mixing a foamable vinyl chloride polymer composition as defined in claim 1,
   forming and foaming said foamable polyvinyl chloride composition,
   into a hard foam product.

6. A process of preparing a hard polyvinyl chloride foam product as set forth in claim 5 wherein said hard foam product is formed by extruding said foamable composition.

7. A hard polyvinyl chloride foam product prepared by the process of claim 5.

8. A hard polyvinyl chloride foam shaped article having a density from about 0.4 to about 1 gm/cm$^3$, comprising:
   a vinyl chloride polymer or copolymer containing up to 30% by weight of at least one comonomer and at least 70% by weight of vinyl chloride
   from 0 to 5% by weight of a plasticizer, and
   from 0.5 to 8% by weight of a high molecular weight polyethylene having a melt index of at most 0.1 as defined in ASTM-D 1238.

9. A hard polyvinyl chloride foam shaped article having a density from about 0.4 to about 1 gm/cm$^3$ as defined in claim 8 wherein said high molecular weight polyethylene is present in an amount from 1.5 to 2.5% by weight.

10. A hard polyvinyl chloride foam shaped article having a density from about 0.4 to about 1 gm/cm$^3$ as defined in claim 8 wherein said high molecular weight polyethylene is present in an amount from 1.5 to 2.5% by weight.

* * * * *

UNITED STATES PATENT OFFICE
CERTIFICATE OF CORRECTION

Patent No. 4,039,488              Dated  August 2, 1977

Inventor(s) Johannes M.A.A. Van der Mark

It is certified that error appears in the above-identified patent and that said Letters Patent are hereby corrected as shown below:

Col. 3, line 22, "polyethane" should read --polyethene--.

Signed and Sealed this

Third Day of January 1978

[SEAL]

Attest:

RUTH C. MASON
Attesting Officer

LUTRELLE F. PARKER
Acting Commissioner of Patents and Trademarks